Nov. 18, 1941.  C. D. PETERSON  2,263,141
FULL SYNCHRONIZED TRANSMISSION GEARING
Filed Aug. 14, 1939  4 Sheets-Sheet 2
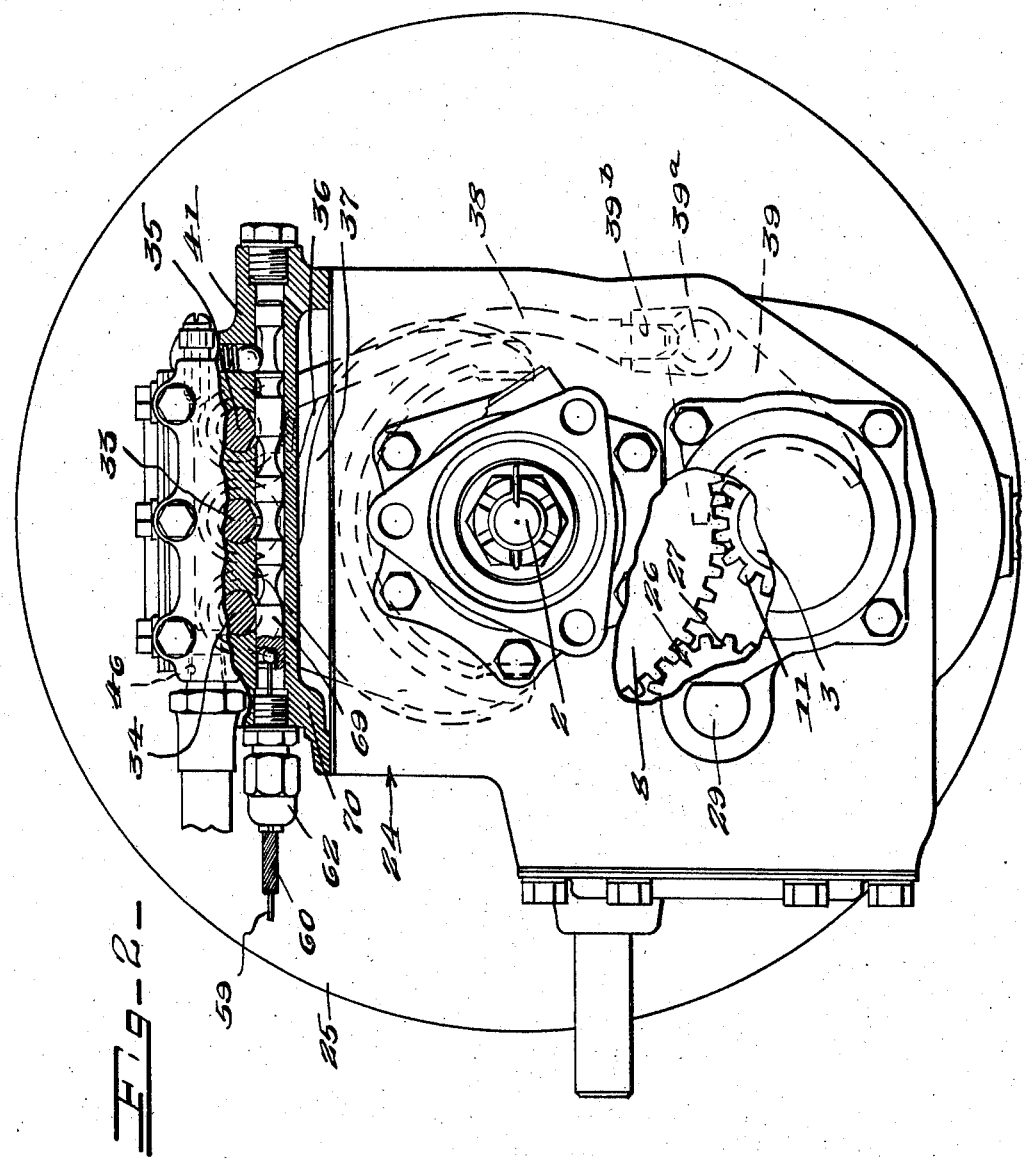
INVENTOR.
Carl D. Peterson
BY Bodell & Thompson
ATTORNEYS.

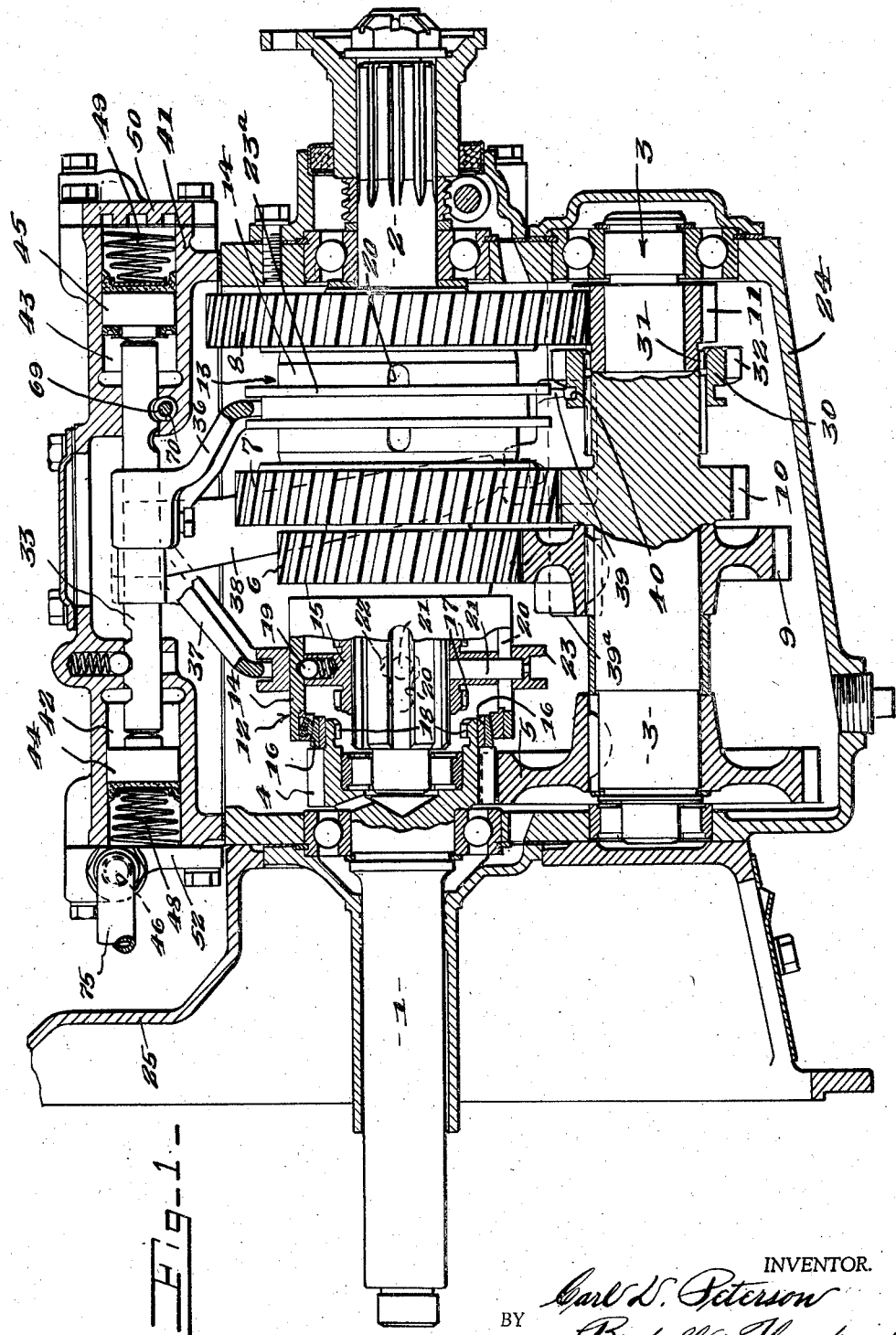

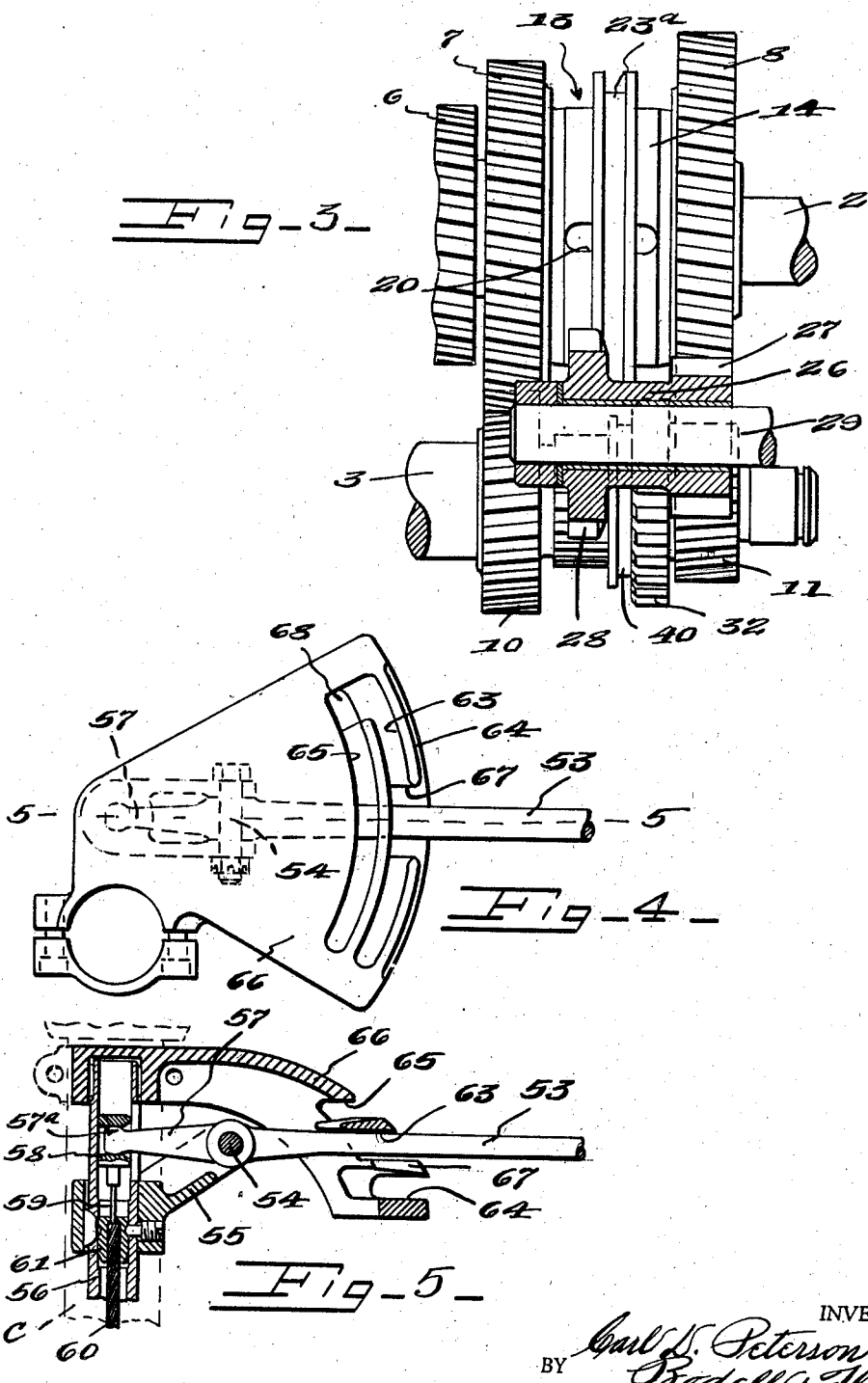

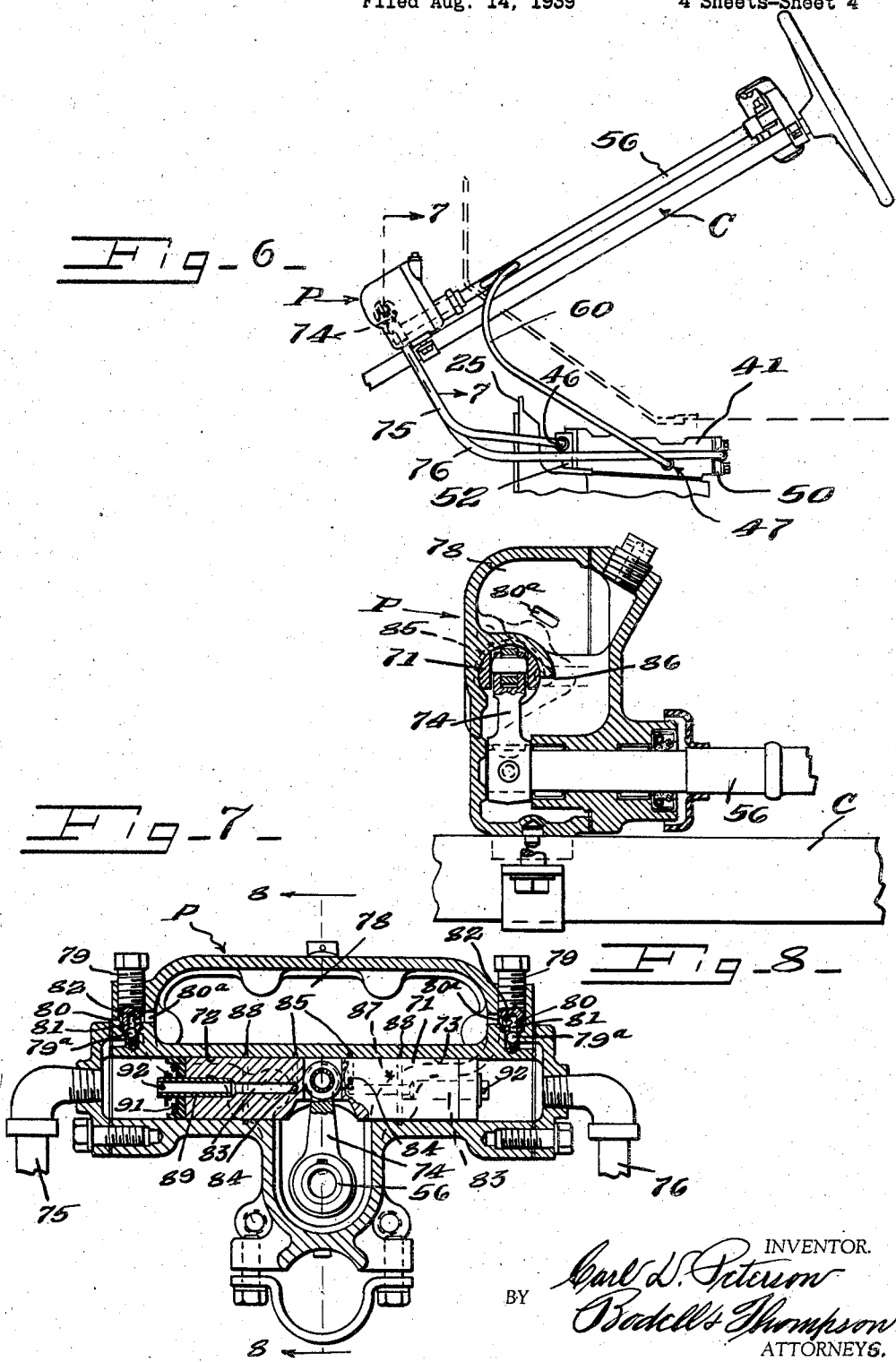

Patented Nov. 18, 1941

2,263,141

UNITED STATES PATENT OFFICE 2,263,141

FULL SYNCHRONIZED TRANSMISSION GEARING

Carl D. Peterson, Toledo, Ohio

Application August 14, 1939, Serial No. 290,061

2 Claims. (Cl. 74—339)

This invention relates to change-speed transmission gearing and has for its object a transmission gearing in which all speeds, including reverse, are synchronized, through selectively shiftable synchronizing clutches, one of these clutches which controls one of the forward speeds, as first speed forward, also effecting the synchronization during the shift into reverse and shiftable into first speed position preliminary to the shift into reverse, and means being provided to compel shifting the synchronizing clutch into first speed position, before the shift can be made into reverse, the shifting into reverse disconnecting the first speed gear train from the drive, except for the final drive gear of the first speed gear train, which is also common with the reverse gear train.

It further has for its object a guide for the selecting and shifting lever for insuring the sequence of operation when shifted into and out of reverse gear.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of a transmission gearing embodying this invention.

Figure 2 is an end view looking to the left in Figure 1.

Figure 3 is a fragmentary elevation, partly in section, of a portion of the gearing shown in Figure 1 illustrating the reverse gear spool.

Figure 4 is a plan view of a selecting and shifting lever and contiguous parts.

Figure 5 is a sectional view on line 5—5, Figure 4.

Figure 6 is a diagrammatic view illustrating the general arrangement of the selecting and shifting mechanism and the transmission gearing.

Figure 7 is a sectional view on the plane of line 7—7, Figure 6, illustrating the pump opererable by the fore and aft shifting movement of the hand control lever.

Figure 8 is a sectional view on line 8—8, Figure 7.

The gearing here shown is a four speed forward and one reverse, and one of the forward speed gear train, as the first gear forward or the final gear of this train is common with the reverse train.

1, 2 and 3 designate respectively the input, output and countershafts of the transmission gearing, the output shaft being arranged in axial alinement with the input shaft.

4 and 5 are intermeshing gears on the input shaft and the countershaft and serve to drive the countershaft 3.

6, 7 and 8 are final drive gears of a plurality of gear trains, these gears being mounted on the output shaft 2 to normally rotate about the same and meshing respectively with gears 9, 10 and 11 on the countershaft. The gears 9 and 10 are rotatable with the countershaft 3 and the gear 11 is normally loosely or rotatably mounted thereon and clutchable thereto.

12 and 13 designate selectively shiftable synchronizing clutches for connecting the input and output shafts 1, 2 through different gear ratios. The synchronizing clutches may be of any suitable form, size and construction, those here shown consisting of an outer friction or sleeve section 14 and an inner toothed section 15 rotatable with the output shaft 2 and being here shown as splined thereon. The friction section has friction faces, as conical friction faces 16 at its opposite ends for coacting with complemental friction faces on the opposing sides of the gear 4 or 6. The toothed section 15 has two sets of teeth or jaws 17 movable into interlocking engagement with sets of teeth 18 on the opposing sides of the gears 4, 6. The two sections 14 and 15 are coupled together by yielding means, as spring-pressed plungers 19, and also have relative rotary movement, within limits. The relative rotary movement is permitted by lengthwise slots 20 in the sleeve section which receive pins or cam posts 21 extending radially from the inner section 15, the slots having notches 22 on opposite sides of its central portion with which notches, the pins or cam posts 21 are normally alined. The pins or cam posts 21 slidably fit in the slots 20.

Each clutch 12 or 13 is shiftable in opposite directions from neutral, and when the clutch 12 is shifted to the left from neutral, the two sections 14 and 15 initially shift as a unit, due to the yielding coupling through the spring-pressed plungers 19, until the clutch face 16 of the section 14 engages the friction face of the gear 4.

Differential speeds of the shafts 1 and 2 cause relative rotary movement of the outer section 14 and inner section 15, moving the pin 21 into one or the other of the notches 22, thus blocking further shifting-in movement of the toothed section 15. The speeds are synchronized through the frictionally engaged faces, and when synchronized, the force tending to rotate the sections 14 and 15 relative to each other is discontinued, and hence the shifting pressure applied will permit the cam posts to pass out of the notch 22 and into the slot 20, and hence permit the clutch teeth 17 to engage the clutch teeth 18.

The shifting is effected through a shifting collar 23 connected to the inner section 15, here shown, as through the posts or pins 21. The shifting collar is actuated through any suitable mechanism.

Shifting of the clutch 12 to the right clutches the gear 6 to the output shaft in substantially the same manner.

Shifting of the synchronizing clutch 13 to the left from neutral clutches the gear 7 to the output shaft and shifting to the right from neutral clutches the gear 8 on the output shaft 2, and in each shift, the speeds are synchronized before the clutch teeth 17 of any synchronizing clutch can come into engagement with their companion clutch teeth on the gear 4, 6, 7 or 8. Any other suitable synchronizing clutch, in so far as this invention is concerned, may be used. When the synchronizing clutch 12 is shifted to the right from neutral, the drive is through a train of gears as follows: Gears 4, 5, countershaft 3, gears 9 and 6, and when shifted to the left from neutral, the drive is directly from the input shaft 1 to the output shaft 2. When the clutch 13 is shifted to the left from neutral, the drive is through gears 4, 5, countershaft 3, gears 10 and 7. When it is shifted to the right from neutral, the drive is through gears 4, 5, countershaft 3, gear 11 which is clutched to the countershaft, as will be presently described, and final drive gear 8.

The gearing is suitably housed in a gear box 24 and the shafts suitably journalled in the end walls thereof. The input shaft 1 is usually the clutch shaft located in the bell housing 25 between the gear box and the fly wheel housing of the engine to which the clutch shaft 1 is connected through the usual main clutch.

26 (Figure 3) designates a reverse gear spool or a double gear having gear portions 27 and 28 at its opposite ends, this spool or double gear being rotatably mounted on a stud 29 mounted in the gear box. The gear 27 of the spool meshes with the gear 8 on the output shaft 2.

30 designates a clutch gear slidable axially of the countershaft 3 and rotatable therewith, it being here shown as splined thereto and as having internal clutch teeth, which are shown at the ends of the internal splines of the clutch gear, shiftable into interlocking engagement with clutch teeth 31 on the hub of the gear 11. The gear portion 32 of this clutch gear 30 is shiftable into mesh with the gear portion 28 of the reverse gear spool and is normally out of mesh therewith. The clutch gear is shifted by suitable shifting mechanism and is normally in the position shown in Figure 1, in which it serves to clutch the gear 11 to the countershaft 3. Thus, when the synchronizing clutch 13 is shifted to the right from neutral, first gear forward will result through the train of gears 4, 5, countershaft 3, gear 11, which is clutched to the countershaft 3, and final drive gear 8. When the clutch gear is shifted to the left, the gear 11 is unclutched from the countershaft 3 and the gear portion 32 shifted into mesh with the gear portion 28 of the reverse spool to effect reverse speed. The selecting and shifting mechanism may be of any suitable form, size and construction with the exception of features hereinafter pointed out.

This shifting mechanism includes shift rods 33, 34 and 35, the shift rod 33 having a fork 36 thereon coacting with the groove in the shifting collar 23ᵃ of the synchronizing clutch 13; the shift rod 34 having a fork 37 coacting with the shifting collar 23 of the clutch 12; and the shift rod 35 having an arm 38 thereon which actuates the fork 39 coacting with the groove or collar 40 formed on the clutch gear. The fork 39 has a hub slidably mounted on a guide rod 39ᵃ. The hub is formed with a notch 39ᵇ which receives the end of the arm 38. The shift rods are mounted for axial shifting in the head or cover 41. As here shown, the end of each rod extends into a cylinder 42 or 43 formed in the head or cover 41 and in which a piston 44 or 45 works, the piston thrusting against the opposite ends of the shift rod and being actuated by a pressure fluid, as a hydraulic fluid, the flow of which is controlled through inlet and outlet passages 46 or 47, the movement of the piston in either direction being against a suitable packing 48ᵃ located in the cylinders 42, 43 between the springs 48, 49 and the pistons, the springs holding the packing in position. The flow of hydraulic pressure through the passage 46 moves the piston 44 to the right, and the piston pushes the shift rod 33 to the right, shifting the synchronizing clutch 13 into position to clutch the gear 8 to the output shaft 2. The opening of the passage 47 permits the hydraulic fluid under pressure to enter the cylinder 43 and push the piston 45 to the left and also the piston 44 to the left. There is a similar cylinder and piston at the end of each of the shift rods and the control of the hydraulic fluid through the passages 46 and 47 is controlled by any suitable means, one form of which will be described.

The rods are selected and shifted or controlled in their shifting movement through an operating lever having fore and aft shifting movement and a selecting lateral movement relatively to its shifting movement. 53 (Figures 4 and 5) designates the selecting and shifting lever. This is pivoted at 54 to a bracket 55 mounted on or keyed to a tube 56 which usually extends lengthwise of the steering column C of a vehicle on the outside thereof or eccentric to the column, this tube being mounted to have a limited rocking movement. The lever 53 also has an arm 57 extending beyond its pivot 54 into the tube 56 through a slot in the side of the tube, the end of the arm being pivotally coupled by a ball and socket joint 57ᵃ to a head 58 which is slidable axially in the tube 56. The head is connected to a push-and-pull or a Bowden wire 59 which also passes through a hollow sheathing 60. The wire is connected to the selector to be presently described. The sheathing is anchored at its opposite ends to plugs 61 (Figure 5) and 62 (Figure 2). The sheathing and the wire pass laterally through the side thereof (see Figure 6).

Shifting of the lever 53 upwardly or downwardly about the pivot 54 moves the head 58 upwardly or downwardly in the tube 56 transmitting movement in one direction or the other to the selector to be presently described, and movement fore and aft about the ball joint connection 51ᵃ rocks the tube 56 and the rocking of this tube operates a pump P which forces the hydraulic fluid through either of the passages 46, 47 and permits the hydraulic fluid to flow freely out of the other. The shifting lever is guided in its selecting and fore-and-aft movement and particularly, in so far as this invention is concerned, to provide the proper sequence of operation of the synchronizing clutch 13 when shifted to clutch the gear 8 to the output shaft 2 and the clutch gear 30, when shifted into reverse gear, by means here shown as guide slots 63, 64, 65 in a plate 66. The lever moves fore or aft in one direction or the other in the guide slot 63 to produce first and second speeds forward, and in the guide slot 64 to effect third and fourth speeds forward, and these two slots 63, 64 communicate through a cross-over slot 67 located to be in line with the lever 53 when the lever is in neutral position. The reverse slot is connected with the end of the first speed forward slot, that is, the end of the first speed forward slot into which the lever 53 has been shifted to produce first speed by a cross-over slot 68, so that the shift may be made into reverse gear only after the synchronizing clutch 13 has been shifted to clutch the gear 8 to the output shaft 2, and then upon shifting forward in the reverse gear slot 65, the clutch gear 30 is shifted to unclutch the gear 11 from the countershaft and shift the clutch gear 30 into mesh with the gear portion 28 of the reverse spool 26. The plate 66 is mounted on the steering column C.

The selector consists of a transversely movable rod 69 located in a passage 70 in the cover 41 crosswise of the shift rods 33, 34, 35 and having notches suitably located as to lock the unselected shift rods from movement, the selector being shifted axially into selected position by the Bowden wire 59 which is operated by the lateral rocking movement of the selecting and shifting lever 53 about its axis 54. The construction of the selector forms no part of this invention. The pertinent feature is the relative arrangement of the slot 65 and the first gear forward slot 63 and the cross-over slot 68.

The pump P consists of a casing supported at the lower end of the steering column C and a double piston 71 (Figure 7) movable from central position in opposing cylinders 72, 73, and an actuating arm 74 mounted on the lower end of the tube 56. The cylinders 72, 73 are connected at their outer ends through pipes 75, 76 to the passages 46, 47 respectively which open into the cylinders 42, 43 in which are located pistons for the shift rods. All the cylinders 42 have a header in common, and likewise the cylinders 43 have a header in common with which the pipes 75, 76 communicate respectively. The unselected shift rods are held from movement, when the selected shift rod and its piston is under pressure, by the locking action of the selector 69. The pump P is provided with a suitable reservoir 78 for the hydraulic fluid and the hydraulic system is a closed one, whereby when the pump piston 71 is actuated in one direction from central or neutral position, as to the left (Figure 7), the hydraulic fluid is forced through the pipe 75 to the cylinders 42, and when actuated to the right, is forced through the pipe 76 to the cylinders 43. When the oil is being forced through either pipe 75, 76 to the cylinder 42 or 43 to actuate the selected shift rod, the oil or fluid is displaced by the shift rod from the companion cylinder 42 or 43 and freely returns through the other pipe 74 or 75. This hydraulic system per se forms no part of this invention, but constitutes the invention of application of Carl D. Peterson, Robert R. Burkhalter and Elmer J. Barth, Serial No. 233,440, filed October 5, 1938. However, the pump P shown herein is in certain respects different from and functions slightly different from that shown in said application.

The pump P is provided with a bleeder and filler plug 79 (Figures 7 and 8) located in a passage 80 between the outer end of each of the cylinders 72 and 73, and the reservoir 78. The plug is formed with an axial passage 81 through its outer end and a laterally extending port 82 which communicates with the portion 80ª of the passage 80 opening into the reservoir 78. The plug coacts with a spring-pressed check valve, as a ball 79ª, which tends to close the passage 81. When the piston 71 is moved toward the outer end of its cylinder 72 or 73, oil or hydraulic fluid is checked by the ball 79ª from returning to the reservoir, but during retrograde movement of the piston, the oil is free to flow from the reservoir 78 into the cylinder in front of the receding piston. The double piston 71 is provided with axial or lengthwise passages 83 opening through its pressure faces and also with radial passages 84 from the inner end of each passage 83 through the periphery of the piston 71. The radial passages 84 communicate at their outer ends with internal grooves 85 in the cylinders 72, 73, these extending in a circumferential direction, and as shown in Figure 8, venting at their ends into the reservoir 78. They open through the edge of the intermediate portion 86 of the wall from the cylinders 72, 73, which intermediate portion is broken away between the cylinders 72 and 73, as seen in Figure 8 and at 87 (Figure 7). Each of the cylinders 72, 73 is also formed with an additional internal vent passage 88 communicating or breaking through the edge of the wall 86 of the intermediate portion of the cylinder, the passage 88 being located between the passages 85 and the outer ends of the cylinders 72, 73. This arrangement is due primarily to the fact that one of the shifts, as the reverse shift, is from one side of neutral to the other side of neutral along the slot 65 (Figure 4). These passages 83, 84 85 and 88 are located to allow the pressure in the cylinders 72, 73 to equalize at the beginning and end of each shift to eliminate building up of errors on quick successive shifts and on reverse shift from the farthest point on one side of neutral to the farthest point on the other side or from one end of slot 65 to the other. The equalization at the end of the strokes of the pistons is not so important, when the gear shifts are completed, as by the two quick successive gear shifts, as there is ample time for the fluid to equalize at the completion of the gear shift or the completion of the last gear shift of a succession of shifts. A portion of the passage 83 is formed in a tube 89 projecting beyond the end of the piston 71 through a packing 90. The packing is held against the piston by a spring 91 interposed between the packing and a pin or shoulder 92 extending through the projecting end of the tube 89.

In operation, when the piston 71 is shifted from neutral, that is, from the cross-over slot 67 in either direction, equalization will take place from the pressure side of one of the pistons 71 through its passage 83, radial passage 84 and the vent or passage 88 with which the radial passage 84 is alined when the piston is in one or the other of its shifted positions. When a quick shift is made from a position wherein the passage 84 of one piston 71 is in line with the vent passage 88 of its cylinder, say the cylinder 73, and a shift is quickly made from this position to the cross-over slot, and immediately in the opposite direction from the cross-over slot, that is, the shift is made from the extreme right hand position of the cylinder 73 to the extreme left hand end position of the cylinder 72, or vice-versa, the passage 84 of the piston 71 in the cylinder 72 will move into registration with the vent 88. Also, the same action takes place when the shift is being made from the first gear slot 63 into reverse slot 65 and along the entire length of the reverse gear, the movement then being from a maximum position one side of central position of the lever 53 to a maximum distance the other side, and the pistons 71 throw from one end of the cylinder 73 into the extreme end of the cylinder 72. By reason of the vent passages 88, the fluid chamber or pressure chamber at opposite ends of the piston quickly equalize the amount of fluid at the beginning and end of each shift.

By the invention set forth herein, differential speeds are synchronized during the shifting of the reverse gear without employing additional synchronizing clutch, and owing to the guide slot for the shifting lever, the proper sequence of operations when shifted first into first speed and then into reverse in order to effect synchronization is insured.

What I claim is:

1. A selecting and shifting mechanism for transmission gearing having elements shiftable into interlocking engagement with other elements to produce different speed ratios through two gear trains having a gear in common, one of the shiftable elements coacting with the gear common to two gear trains embodying synchronizing means, and a second of said shiftable elements being shiftable into and out of one of said two trains having a gear in common, the selecting and shifting mechanism including an operating lever having a fore-and-aft shifting movement in a plurality of paths, and a lateral selecting movement, when in neutral position, into any one of the fore-and-aft paths and also having a second lateral selecting and shifting movement from the fore-and-aft shifted position occupied when the shiftable element coacting with the gear common to two trains is operatively connected in driving relation, and shifting movement in an additional fore-and-aft path when in its second selected position to shift said second shiftable element into and out of one of the two trains of gears which includes the gear in common, and synchronized by one shiftable element, means for preventing the selecting movement of the lever, except when in neutral position, and when in second selected position, and connections operated by the lever for shifting the selected shiftable element into engaged position.

2. A selecting and shifting mechanism for transmission gearing having elements shiftable into interlocking engagement with other elements to produce different speed ratios through two gear trains having a gear in common, one of the shiftable elements coacting with the gear common to two gear trains embodying synchronizing means, and a second of said shiftable elements being shiftable into and out of one of two trains having a gear in common, the selecting and shifting mechanism including an operating lever having a fore-and-aft shifting movement in a plurality of paths, and a lateral selecting movement, when in neutral position, into any one of the fore-and-aft paths and also having a second lateral selecting and shifting movement from the fore-and-aft shifted position occupied when the shiftable element coacting with the gear common to two trains is operatively connected in driving relation, and shifting movement in an additional fore-and-aft path when in its second selected position to shift said second shiftable element into and out of one of the two trains of gears which includes the gear in common, and synchronized by one shiftable element, means for preventing the selecting movement of the lever, except when in neutral position, and when in second selected position, connections operated by the lever for shifting the selected shiftable element into engaged position, the selecting and shifting mechanism also including a selector operated by the selecting movement and serving to lock the unselected shifters from movement and to lock the shiftable element coacting with the gear in common to two trains in shifted position when the lever is in said second selected position and to unlock another shiftable element during the selecting movement from said second selected position, a hydraulic motor operated by the selecting and shifting lever during the fore-and-aft movement thereof to shift the selected shiftable element, said hydraulic motor being common to all of the shiftable elements.

CARL D. PETERSON.